United States Patent
Giandomenico

(10) Patent No.: US 10,977,011 B2
(45) Date of Patent: Apr. 13, 2021

(54) STRUCTURED DEVELOPMENT FOR WEB APPLICATION FRAMEWORKS

(71) Applicant: salesforce.com, inc., San Francisco, CA (US)

(72) Inventor: Francisco Di Giandomenico, Pilar (AR)

(73) Assignee: salesforce.com, inc., San Francisco, CA (US)

(*) Notice: Subject to any disclaimer, the term of this patent is extended or adjusted under 35 U.S.C. 154(b) by 0 days.

(21) Appl. No.: 16/264,270

(22) Filed: Jan. 31, 2019

(65) Prior Publication Data

US 2020/0249921 A1 Aug. 6, 2020

(51) Int. Cl.
| | | |
|---|---|---|
| *G06F 8/36* | (2018.01) | |
| *G06F 9/455* | (2018.01) | |
| *G06F 8/34* | (2018.01) | |
| *G06F 8/10* | (2018.01) | |

(52) U.S. Cl.
CPC .............. *G06F 8/36* (2013.01); *G06F 8/10* (2013.01); *G06F 8/34* (2013.01); *G06F 9/45529* (2013.01)

(58) Field of Classification Search
CPC ..... G06F 8/36; G06F 8/10; G06F 8/34; G06F 9/45529
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |

(Continued)

OTHER PUBLICATIONS

Filippo Ricca et al., Restructuring Web application via transformation rules, IEEE, Jan. 1, 2001, retrieved online on Dec. 12, 2020, pp. 150-160. Retrieved from the Internet: <URL: https://ieeexplore.ieee.org/stamp/stamp.jsp?tp=&arnumber=972676>. (Year: 2001).*

(Continued)

*Primary Examiner* — Hanh Thi-Minh Bui
(74) *Attorney, Agent, or Firm* — Jaffery Watson Mendonsa & Hamilton LLP

(57) ABSTRACT

In an enterprise cloud computing environment, a system for structured development for web application frameworks is implemented to develop applications efficiently. A structured development tool analyzes a component specification of a web application under development. The structured development tool is capable of generating a functional decomposition of the web application based on the component specification. The structured development tool is further capable modifying the component specification based on analyzing the structure of the components described in the component specification for redundancy and reusability, and further capable of modifying the component specification to restructure the components to reduce any redundancy and take advantage of reusable components.

17 Claims, 11 Drawing Sheets

(56) References Cited

U.S. PATENT DOCUMENTS

| | | |
|---|---|---|
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,631,376 B1 * | 10/2003 | Yamamoto ................ G06F 8/10 |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,129,258 B2 | 11/2018 | Chasman et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0037714 A1 * | 2/2009 | DeWeerdt ................ G06F 8/36 713/1 |
| 2009/0177744 A1 | 7/2009 | Marlow et al. |
| 2016/0103586 A1 * | 4/2016 | Greenberg ............. G06Q 30/06 715/739 |

OTHER PUBLICATIONS

React JS—React JavaScript—www.reactjs.org—A JavaScript Library for Building User Interfaces, Facebook Open Source, Initial Public Release date, Jul. 2, 2013, 5 pages.

React Sight Node Package Manager—https://github.com/React-Sight/React-Sight-NPM—Visualization Tool for React Applications, Oct. 17, 2017, 1 page.

* cited by examiner

300 – EXAMPLE STRUCTURED DEVELOPMENT OF A WEB APPLICATION

310 – INPUT COMPONENT SPECIFICATION FOR WEB APPLICATION "UtilityApp"

```
UtilityApp

-ToDoListComponent
    -NewToDoItemView
        doc:
            -This is where a new To-do item will be
             written
            -The Add button will add the To-do item
             and clear the TextField
        uses:
            -TextField
            -Button
        state:
            value: string
    -ToDoList
        doc:
            -This shows the list of To-do items
        uses:
            -Button
            -Label
            -Tooltip
        props:
            todoItems: string[ ]
    -ToDoItem
        Props:
            toDoItem: string -ShoppingListComponent
    -NewShoppingListItemView
        doc:
            -This is where a new shopping list item
             will be written
            -The Add button will add the to-do item
             and clear the TextField
        uses:
            -TextField
            -Button
        state:
            value: string
    -ShoppingList
        doc:
            -This shows the shopping list
        uses:
            -Button
            -Label
            -Tool tip
        props:
            shoppingListItems: string[]
    -ShoppingListitem
        props:
            shoppingListitem: string
```

Fig.3A.

320 - OUTPUT PROMPT FOR STRUCTURED DEVELOPMENT OF "UtilityApp"

```
Reading UtilityApp.rsl ...

Optimization suggestions found.

ToDoListComponent and ShoppingListComponent have
similar internal Structures, and a common, re-
usable component can be extracted.
```

Fig.3B.

330 – CURRENT COMPONENT STRUCTURE FOR
STRUCTURED DEVELOPMENT OF "UtilityApp"

```
Current calculated component structure:

-ToDoListComponent
    -NewtoDoItemView
        newtoDoItemView.tsx
    -ToDoList
        ToDoItem
            toDoItem.tsx
    -toDoListComponent.tsx -ShoppingListComponent
    -NewShoppingListItemView
        newShoppingListItemView.tsx
    -ShoppingList
        ShoppingListItem
            shoppingListItem.tsx
        shoppingList.tsx
    shoppingListComponent.tsx
```

Fig.3C.

340 – PROPOSED NEW COMPONENT STRUCTURE FOR STRUCTURED DEVELOPMENT OF "UtilityApp"

```
Proposed (new) calculated component structure:

-ListComponent
    -NewItemView
        newItemView.tsx
    -ItemList
        Item
            item.tsx
    -itemList.tsx -ToDoListComponent
    -ToDoItem
        toDoItem.tsx
    -toDoListComponent.tsx -ShoppingListComponent
    -ShoppingListItem.tsx
        shoppingListItem.tsx
    -shoppingListComponent.tsx
```

Fig.3D.

350 – OUTPUT FOR PROPOSED MODIFIED COMPONENT
SPECIFICATION FOR WEB APPLICATION "UtilityApp"

```
Proposed (new) specification file:

UtilityApp

-ListComponent
    props:
        itemComponent: ComponentType<{item:
                                    String }>
    -NewItemView
        doc:
            -This is where a new item will be
             written
        state:
            value: string
        uses:
            -TextField
            -Button
    -ItemList
        doc:
            -This shows the list of items
        props:
            items: string[]
            itemComponent: ComponentType<{item:
                                        String }>
        uses:
            -Button
            -Label
            -Tooltip -ToDoListComponent
    uses:
        -ListComponent
    -ToDoItem
        props:
            item: string -ShoppingListComponent
    uses:
        -ListComponent
    -ShoppingListItem
        props:
            item: string
```

Fig.3E.

360 - OUTPUT PROMPT TO ACCEPT PROPOSED MODIFIED COMPONENT SPECIFICATION FOR WEB APPLICATION "UtilityApp"

```
Would you like to apply the modification? (Y/N): Y

What would you like the extracted component name to
be? (ListComponent)

RSL SPECIFICATION FILE has been updated
successfully!
```

STRUCTURED DEVELOPMENT FOR WEB APPLICATION FRAMEWORKS

TECHNICAL FIELD

Embodiments of the invention relate generally to the field of software development, and more particularly, to software tools for development of web-based applications.

BACKGROUND

Modern software development models for web-based applications are based on a continuous integration/continuous delivery (CI/CD) that integrates development and operation of software into a process referred to as "DevOps." Rather than a traditional software development model with discrete analysis, specification, programming, testing and operational phases, CI/CD promotes rapid development of software applications through continuous integration of code and delivery of the code into production operation.

To meet the demands of CI/CD developers often create components, directories and sub-directories for a software application "on the fly" without going through the analysis and specification phases associated with the traditional software development model. Such an approach can result in component redundancy and code that is inefficient and difficult to maintain.

BRIEF DESCRIPTION OF THE DRAWINGS

The included drawings, by way of example only and not limitation, illustrate possible structures and operations for implementing the disclosed inventive systems, apparatus, methods, and computer-readable storage media. The drawings do not limit any changes in form and detail that may be made by one skilled in the art consistent with the spirit and scope of the disclosed implementations.

FIGS. 3A-3G illustrate an exemplary component specification and interface for structured development for web application frameworks according to one embodiment;

DETAILED DESCRIPTION

Figure 1:
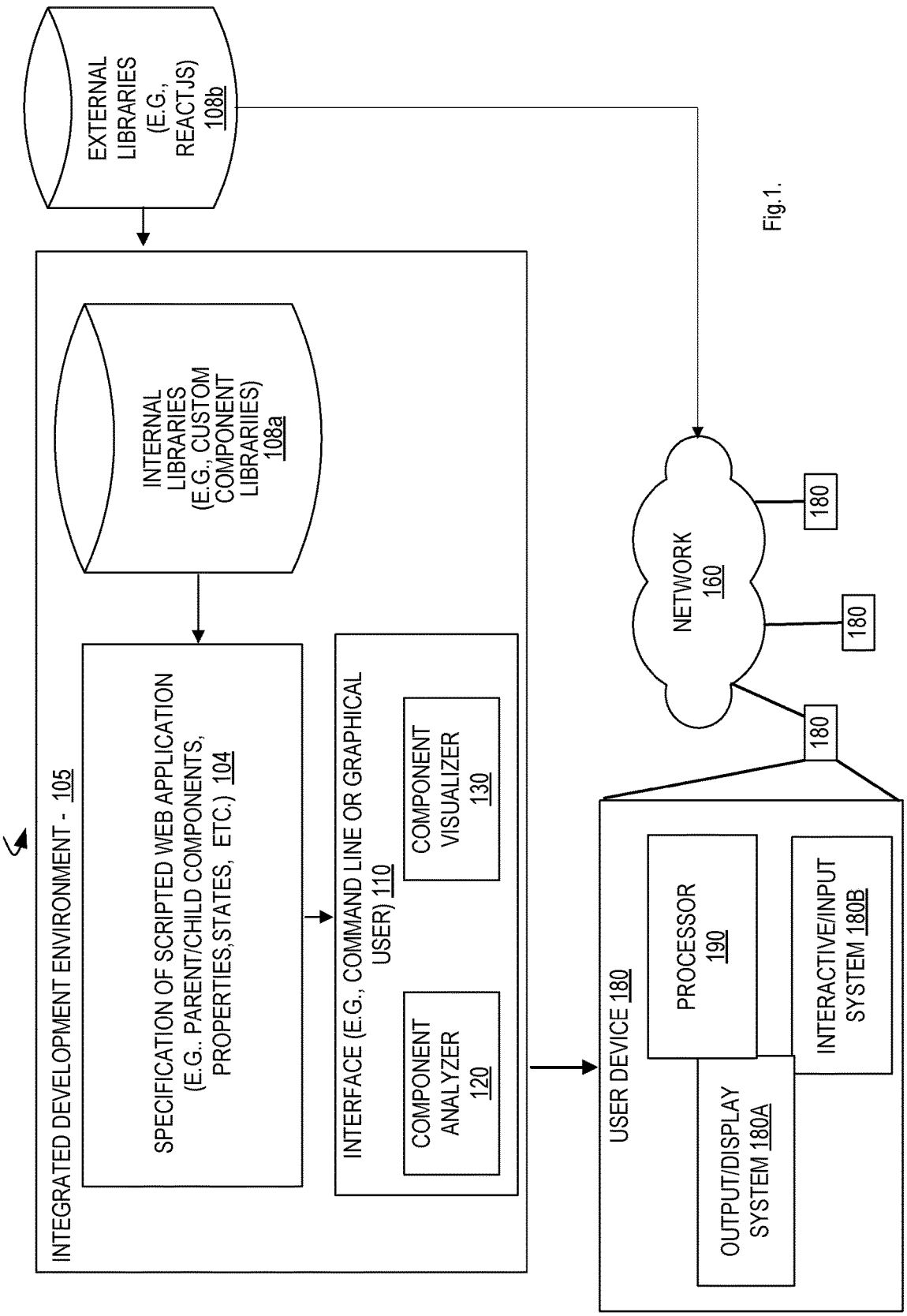
FIG. 1 illustrates an overview of a system for structured development for web application frameworks in an integrated development environment of an enterprise computing platform according to one embodiment.

When developing a scripted web application for a project, it is common to start creating components, directories and sub-directories for the project only to realize that refactoring is needed. Refactoring is the process of re-writing code in a software application to improve the code's internal structure without altering the external operation of the code. In other words, refactoring should retain the code's original functionality. Refactoring code is time consuming because it requires moving, deleting and creating new files.

To address this problem many web application frameworks, such as the React JS (JavaScript) framework, do allow for a design phase to structure how components interact with each other and where they reside. However, developers often skip the design phase to meet the demands of the CI/CD software development model. For the same reason, developers often fail to take advantage of reusable components provided by web application frameworks. Used properly, reusable components can speed the development of web applications and result in the creation of more efficient and maintainable code that is less likely to require refactoring.

In keeping with the foregoing observations, embodiments of a system for structured development for web application frameworks are described in which a structured development tool operates to analyze a component specification of a web application and further, to propose modifications to improve the component specification, including modifications that will reduce the need to refactor the code after development has been completed.

Embodiments of methods and systems are described for analyzing and modifying a component specification of a web application on computing devices in an integrated development environment (IDE). The web application for which the component specification can be analyzed and modified includes applications destined for deployment in an enterprise cloud computing environment, including deployment in an on-demand services and multi-tenant environment. Embodiments may be implemented on a platform that enables web applications to be built and deployed on both stationary and mobile devices, such as desktop computers, laptop computers, tablet computers, smartphones, wearable devices, touch-enabled devices, etc., operating on any number and type of operating systems.

In one embodiment, to develop a web application to run on a platform provided by an enterprise cloud platform operating environment, such as HEROKU®, or Salesforce1®, methods and systems for structured development for web application frameworks operate in an IDE. The IDE, such as the Webstorm cross-platform IDE, supports web application development using one or more frameworks, such as React, Vue, AngularJS and Polymer, and supports scripting languages such as JavaScript and TypeScript, and associated script libraries as noted below.

In one embodiment, the enterprise cloud platform operating environment may employ events or features associated with images, such as HyperText Markup Language ("HTML"), etc., and components, such as Salesforce Wave™ or Visualforce® components, SOQL and APEX components etc., that may rely on data residing in the enterprise cloud or in an on-demand services environment. It is contemplated that embodiments are not limited to any particular number or type of operating systems, such as Apple® iOS®, Android®, etc. Similarly, it is contemplated that any number and type of libraries (e.g., ReactJS, jQuery, AngularJS, KineticJS, NodeJS, ExpressJS, HammerJS, iScroll, etc.) and compatible IDEs may be used in embodiments of a system for structured development for web application frameworks to develop web applications for deployment on computing devices in the enterprise cloud or on-demand services environment.

It is further contemplated that embodiments and their implementations are not merely limited to developing web applications for use in a multi-tenant database system ("MTDBS"). Rather, embodiments of a system for structured development for web application frameworks can be used to develop applications for other environments, such as a client-server system, a mobile device, a personal computer (PC), a web services environment, etc. However, for the sake of brevity and clarity, throughout this document, embodiments are described as a system for structured development for web application frameworks for developing applications for use in a multi-tenant database system, such as Salesforce.com®, which is to be regarded as an example of an on-demand services environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Embodiments are described in which a system for structured development of web applications deployed in an on-demand services environment include web applications for systems having an application server providing a front end for an on-demand database service capable of supporting multiple tenants. However, it should be understood that the described embodiments of a system for structured development of web applications are not limited to applications developed for multi-tenant databases or for deployment on application servers. Embodiments may be practiced to provide structured development of web applications using other database architectures, i.e., ORACLE®, DB2® by IBM and the like without departing from the scope of the claimed embodiments.

FIG. 1 illustrates an overview of an exemplary system 100 for structured development for web application frameworks operating in an integrated development environment (IDE) 105. The system 100 includes, among others, multiple internal libraries 108a and external libraries 108b and an application development interface 110 to the IDE that includes, among other components, a component analyzer 120 and a component visualizer 130 that operate in conjunction with the IDE 105 to provide structured development for web application frameworks as a stand-alone and/or integrated feature of the IDE 105.

In one embodiment, a component specification 104 can be a file that specifies how one or more components of a web application are to be developed, including basic tree structures that identify parent components and their children, as well as component interaction, i.e. identifying information that will be passed from parent to child elements of components, including such information as properties, states, etc. In one embodiment, the component specification 104 can identify the ECMA (European Computer Manufacturer's Association) standard with which the component specification complies, such as ES5 and ES6, to vary what kinds of operators and syntax can be used in the file. The component specification 104 can further identify the languages chosen for the structure of the web application under development, including the scripting language (e.g. JavaScript, TypeScript) and the styling specification (e.g. CSS, PostCSS and SCSS). In one embodiment, the component specification 104 specifies each components properties and state to facilitate the operation of the component analyzer 120, particularly for analyzing redundancy and proposing modifications to the structuring of the application based on properties in common between two or more components, as well as for determining whether two components are functionally equivalent and possibly abstracted into a single, re-usable component.

In one embodiment, the component specification 104 can be associated with test files, either at the same level as the components of the component specification 104, or in a separate "tests" directory. In one embodiment, the component analyzer 120 can generate test files using the given default values of the properties of the components, where the given default values are specified in the component specification 104.

In one embodiment, the component analyzer 120 is implemented as a structured development tool that is accessible through the application development interface 110 to the IDE 105 and operates to analyze redundancy in the components of the component specification 104. In one embodiment the application development interface 110 to the IDE can be implemented in a command line interface or in a graphical user interface.

In one embodiment, the component analyzer 120 generates one or more proposed modifications to reduce the need for refactoring, including modifications that will reduce code redundancy and/or increase the use of reusable code where possible. For example, in one embodiment, the component analyzer 120 retrieves information about the components specified in the component specification 104 from the internal and external libraries 108a/108b and displays the results of the analysis in the form of one or more proposed modifications to the component specification 104, including modifications to restructure the components and include any one or more reusable components available in any of the internal and external libraries 108a/108b. The external libraries 108b can include various types of libraries for use with a specific web application framework. For example, for the React web application framework, the external libraries can include libraries for React Redux, React Router, React Boilerplate and React Context API components as well as a library such as the Material UI library for React components that implement Google's Material Design design language. In one embodiment, the external libraries 108b can include testing libraries, such as Jest, Mocha, Chai and Enzyme. In one embodiment the external libraries 108b can include one or more linting files for analyzing code for various types of coding errors.

In one embodiment, the proposed one or more modifications to the component specification 104 include modifying and/or eliminating a redundant component. The one or more modifications can further include proposing a candidate for a reusable component to use in place of any one or more the components described in the component specification 104. Upon acceptance by the user/developer, the component analyzer 120 generates a modified component specification 104 to facilitate the generation of efficient and maintainable code that is less likely to require refactoring. In one embodiment, the component analyzer 120 includes a scaffolding feature that implements customization options for structuring components, such as custom file naming conventions, preferred scripting language (TypeScript, JavaScript), directory structure, etc.

In one embodiment, a component visualizer 130, also accessible through the application development interface 110, operates to generate a graphical representation of the component specification 104 and any of the proposed modifications to the component specification. In one embodiment, the graphical representation of the component specification 104 and any proposed modification can be a graphical representation of a functional decomposition of the components comprising the web application, either as specified in the original component specification 104 and/or as modified as proposed by the component analyzer 120 in a modified component specification. An example component specification 104, along with examples of the results of the operation of the component analyzer 120 and the component visualizer 130 are described in further detail with reference to FIGS. 3A-3G.

In one embodiment, the component analyzer 120 and the component visualizer 130 are accessible on the IDE 105 over network 160 and processor 190 coupled to user device 180. The user device 180 displays and interacts with the component analyzer 120 and the component visualizer 130 using the device's output/display system 180A and interactive input system 180B.

In one embodiment, integrated development environment 105 and application development interface 110 may operate in conjunction with an enterprise cloud computing platform that includes server computers (e.g., cloud server computers, etc.), desktop computers, cluster-based computers, set-top boxes (e.g., Internet-based cable television set-top boxes, etc.), and the like. The user devices 180 with which a user interacts with the integrated development environment 105 and application development interface 110 may include smaller computers, such as mobile computing devices, such as cellular phones including smartphones (e.g., iPhone® by Apple®, BlackBerry® by Research in Motion® Limited, now known and trading as BlackBerry®, etc.), handheld computing devices, personal digital assistants ("PDAs"), etc., tablet computers (e.g., iPad® by Apple®, Galaxy® by Samsung®, etc.), laptop computers (e.g., notebooks, netbooks, Ultrabook™ systems, etc.), e-readers (e.g., Kindle® by Amazon.com®, Nook® by Barnes and Nobles®, etc.), media internet devices ("MIDs"), smart televisions, television platforms, wearable devices (e.g., glasses (e.g., Google® Glass® by Google®, watches, bracelets, smartcards, jewelry, clothing items, etc.), media players, Global Positioning System ("GPS")-based navigation systems, cable setup boxes, etc.

The integrated development environment 105 and application development interface 110 are implemented on an operating system ("OS") and the user devices 180 also include an OS serving as an interface between any hardware or physical resources of the integrated development environment/interfaces/devices 105/110/180 and a user. The integrated development environment/interfaces/devices 105/110/180 can further include one or more processors, memory devices, network devices, drivers, or the like, as well as input/output ("I/O") sources, such as output/display system 180A and interactive input system 180B, including touchscreens, touch panels, touch pads, virtual or regular keyboards, virtual or regular mice, etc.

It is to be noted that terms like "node", "computing node", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "code", "software code", "application", "software application", "program", "software program", "package", "software code", "code", and "software package" may be used interchangeably throughout this document. Moreover, terms like "job", "input", "request" and "message" may be used interchangeably throughout this document. It is to be further noted that terms like "build", "generate", "create", "develop", "make", or the like, and any of their variations, such as "building", "generating", "creating", developing", "making", respectively, may be referenced interchangeably throughout this document.

Figure 2:
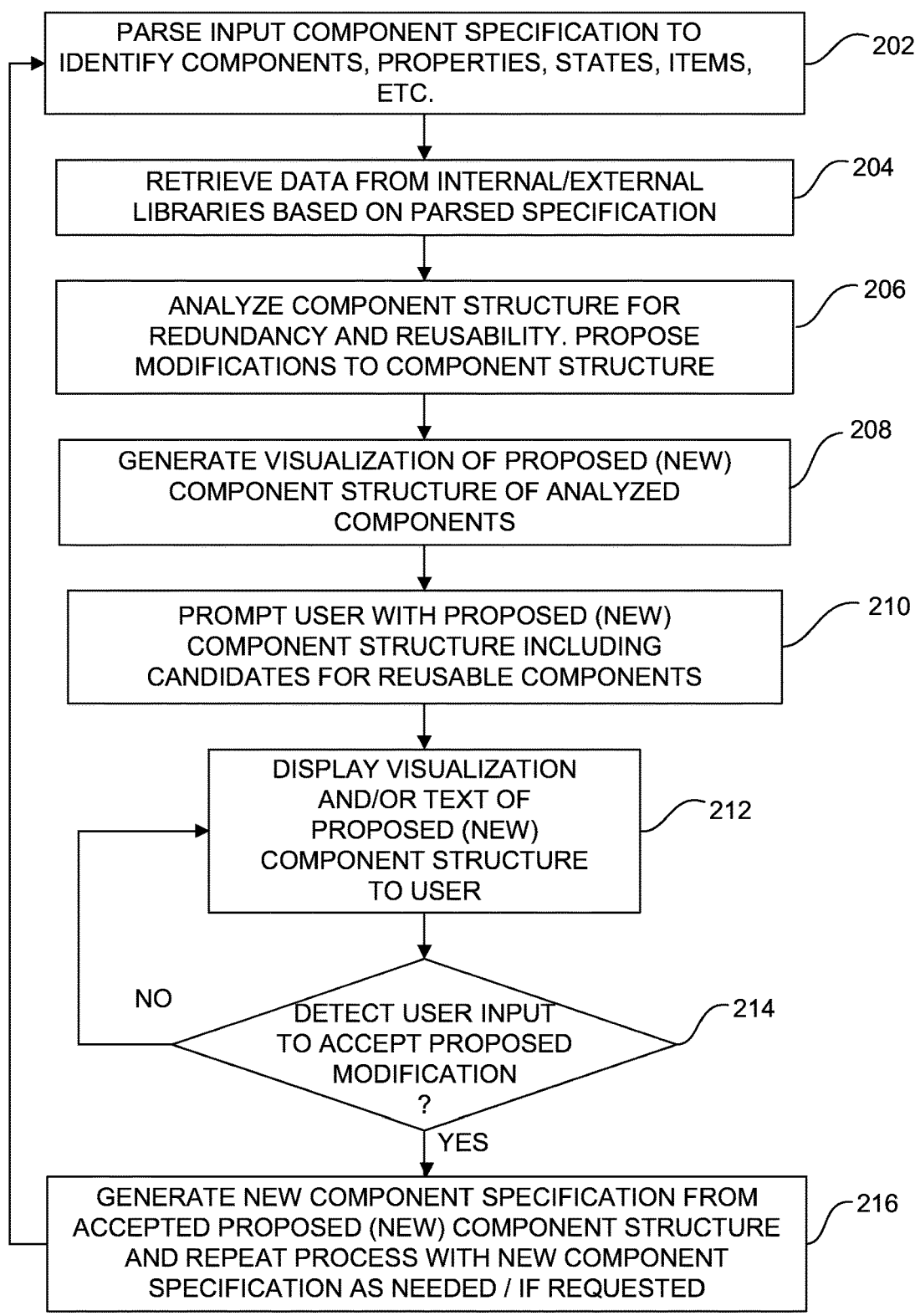
FIG. 2 is a process flow diagram illustrating a process for structured development for web application frameworks according to one embodiment.

FIG. 2 is a process flow diagram illustrating a process 200 for structured development for web application frameworks according to one embodiment. Process 200 commences at 202 to parse the input component specification 104 to identify components and their respective properties, states, items, etc. and the various fields, labels, buttons, and other objects used to generate the user interface (UI) of the web application. At 204, the process 200 retrieves data from internal/external libraries 108a/108b based on the parsed component specification 104. For example, the process 200 retrieves existing custom components from the internal libraries 108a that match or have similar characteristics to the components identified in the input component specification 104, the characteristics including of any one or more of the component names, item names, properties, etc. The process 200 can also retrieve reusable components from any of the internal and external libraries 108a/108b that match or have similar characteristics to the components identified in the input component specification 104.

In one embodiment, at 206, the process 200 analyzes components specified in the component specification 104 for redundancy, including whether there exists an available reusable component on libraries 108a/108b that could be used in place of or in conjunction with the components specified in the component specification 104. At 208, the process 200 generates a visualization of any proposed new component structure or restructuring of analyzed components, including any reusable components retrieved from libraries 108a/108b. At 210, the process 200 prompts the user/developer with the proposed modification, including any of the re-structured components and/or candidates for reusable components.

In one embodiment, optionally, at 212, the process 200 displays the visualization and/or the text of the proposed new component structure for the restructuring of the analyzed components to the user/developer. In addition, at 212, the process 200 generates and displays to the user a proposed new/modified component specification 104 based on the proposed new component structure. At decision 214, the process 200 detects any user input to either accept or decline the proposed modified component specification 104 for the web application under development. Lastly, at 216, the process 200 repeats itself as needed depending on the user input as needed or as requested. For example, in one embodiment the user/developer can edit the proposed modified component specification 104 and the process 200 can be repeated using the edited component specification as the input component specification 104 at 202.

In one embodiment, the process 200 illustrated in FIG. 2 is implemented as part of the application development interface 110 to the IDE 105 operating in communication 160 with a user display device 180 having an output display system 180A and interactive input system 180B operated by a user/developer. However, it should be understood that portions or all of the process 200 may be implemented in other systems or interfaces of the enterprise cloud platform operating environment without departing from the scope of the claimed embodiments.

Figure 3F:

By way of example only, and not limitation, FIGS. 3A-3G illustrate various aspects of an exemplary implementation 300 of structured development for web application frameworks. In particular, FIG. 3A illustrates an example of an input component specification 310 for a web application entitled "UtilityApp." As shown, the component specification 310 describes the "UtilityApp" as composed of a "ToDoListComponent" and a "ShoppingListComponent" each component sharing some similarities. For example, both components contain components to add items to the respective lists, and to view items from the respective lists.

FIG. 3B illustrates an example output prompt 320 generated during processing of the input component specification 310 by the component analyzer 120 of FIG. 1 and as described in FIG. 2. As shown, the output prompt 320 includes the message "ToDoListComponent and ShoppingListComponent have similar internal Structures, and a common, re-usable component can be extracted."

FIG. 3C illustrates the example input component structure 330 generated by the component analyzer 120, specifically a text representation of the current component structure calculated based on the input component specification 310. The component analyzer 120 also generates a proposed new calculated component structure 340 as illustrated in the example output component structure 340 as illustrated in FIG. 3D, specifically a text representation of the new calculated component structure after completion of the processes as described in FIG. 2.

FIG. 3E illustrates an example of the output for the proposed modified component specification for web application "UtilityApp" 350. In one embodiment, the proposed modified component specification is automatically generated by the component analyzer 120 based on the proposed new calculated component structure 340, as illustrated in FIG. 3D. As shown, and consistent with the proposed new calculated component structure 340, the proposed modified component specification 350 includes a modification of the two similar components of the UtilityApp, namely the "ToDoListComponent" and the "ShoppingListComponent," and further includes a new reusable "ListComponent" abstracted out of the original components and/or obtained from one of the libraries 108a/108b.

FIG. 3F illustrates a prompt 360 included in the application development interface 110 to prompt the user/developer to accept or decline the proposed modified component specification 350 through a user input, such as "Y" for Yes and "N" for No.

Figure 3G:
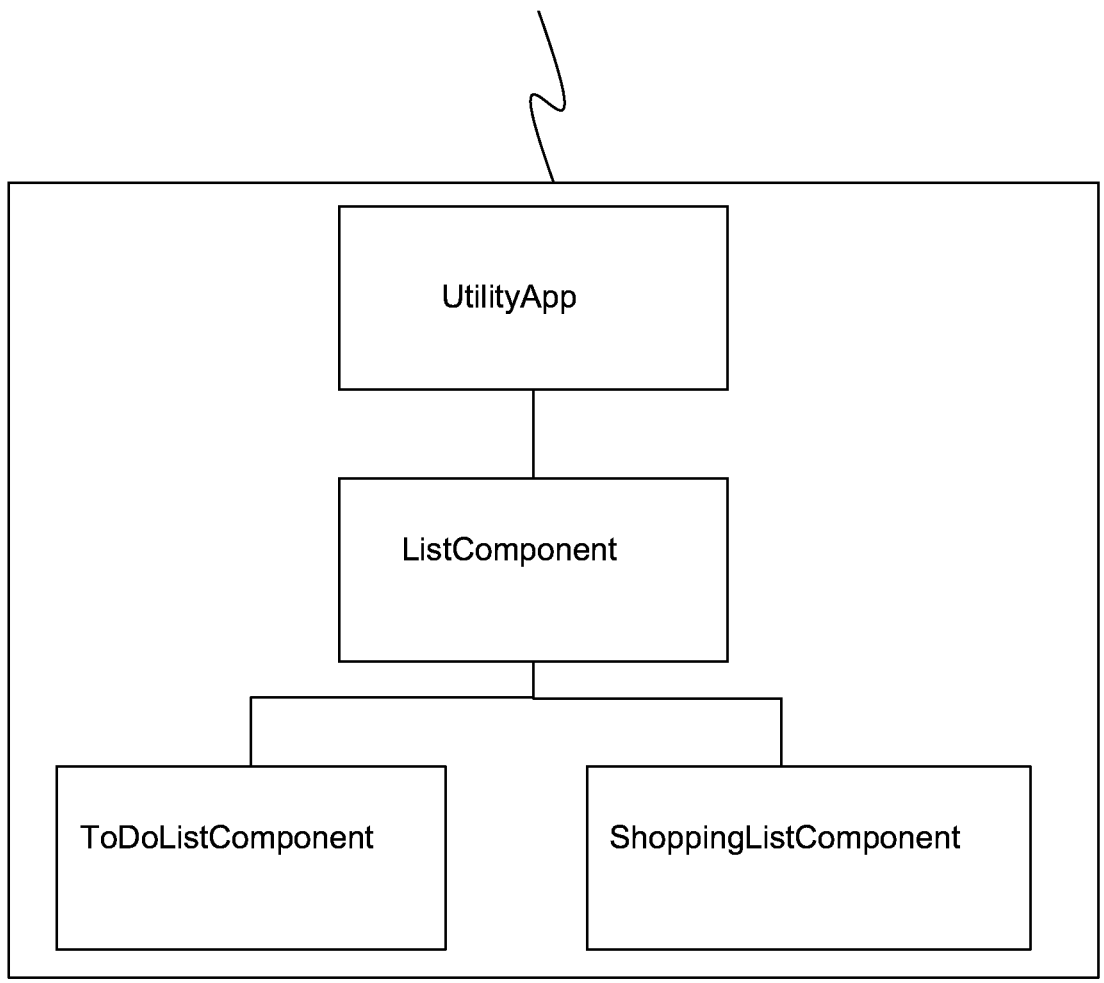

Lastly, in FIG. 3G, an optional output visualization 370 of the proposed new calculated component structure 340 (FIG. 3D) of web application "UtilityApp" can also be provided to enable the user/developer to apprehend at a glance the restructured version of the "UtilityApp."

Figure 4A:
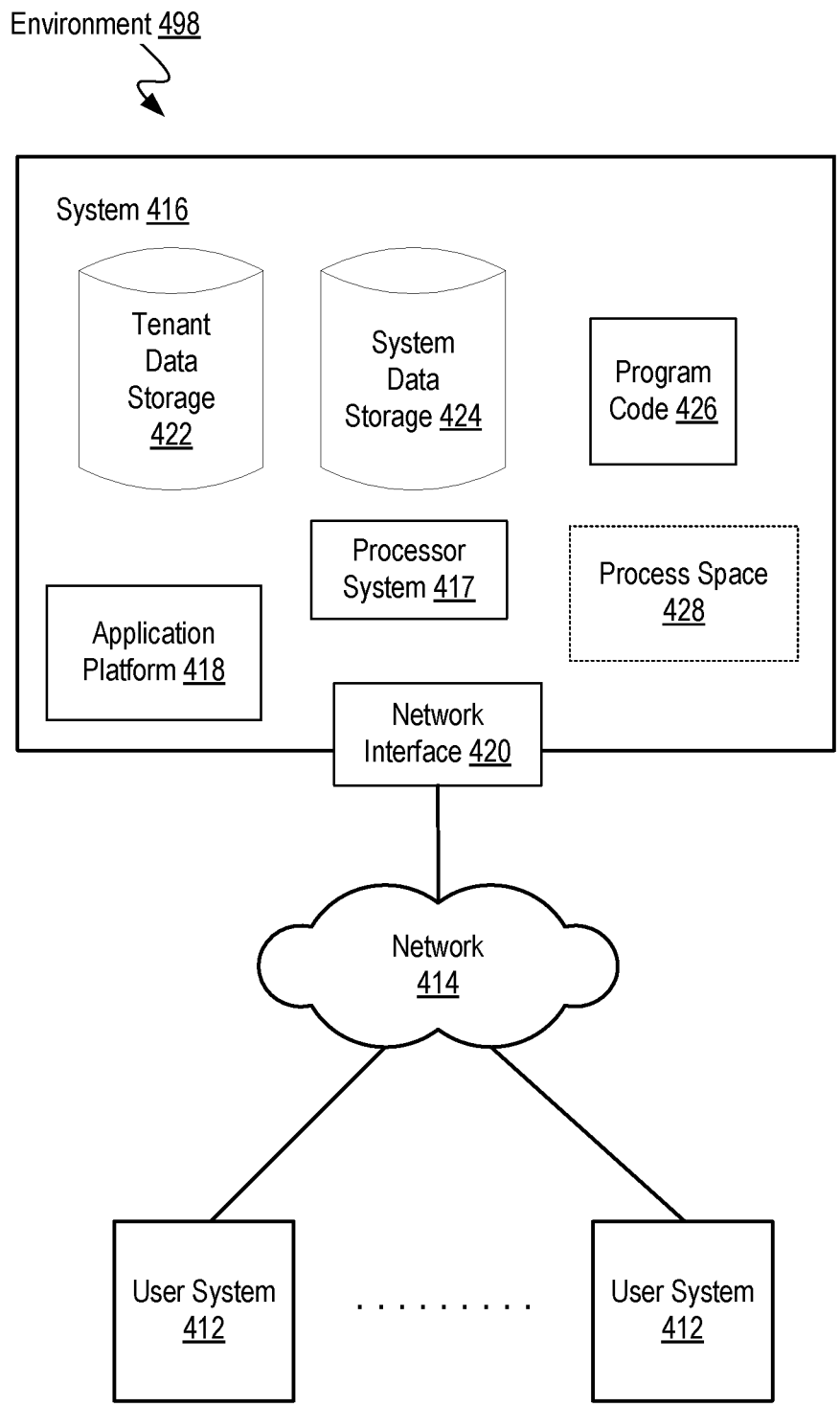
FIGS. 4A-4B illustrate exemplary elements of an operating environment of a system for structured development for web application frameworks according to one embodiment.

FIG. 4A illustrates a block diagram of an environment 498 in which an on-demand database service that supports a web application developed using a system for structured development in accordance with the described embodiments. Environment 498 may include user systems 412, network 414, system 416, processor system 417, application platform 418, network interface 420, tenant data storage 422, system data storage 424, program code 426, and process space 428. In other embodiments, environment 498 may not have all of the components listed and/or may have other elements instead of, or in addition to, those listed above.

Environment 498 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4A (and in more detail in FIG. 4B) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" is used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4A, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4A, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4A include conventional, well-known elements that are explained only briefly here. For example, each user system 412 may include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4B:
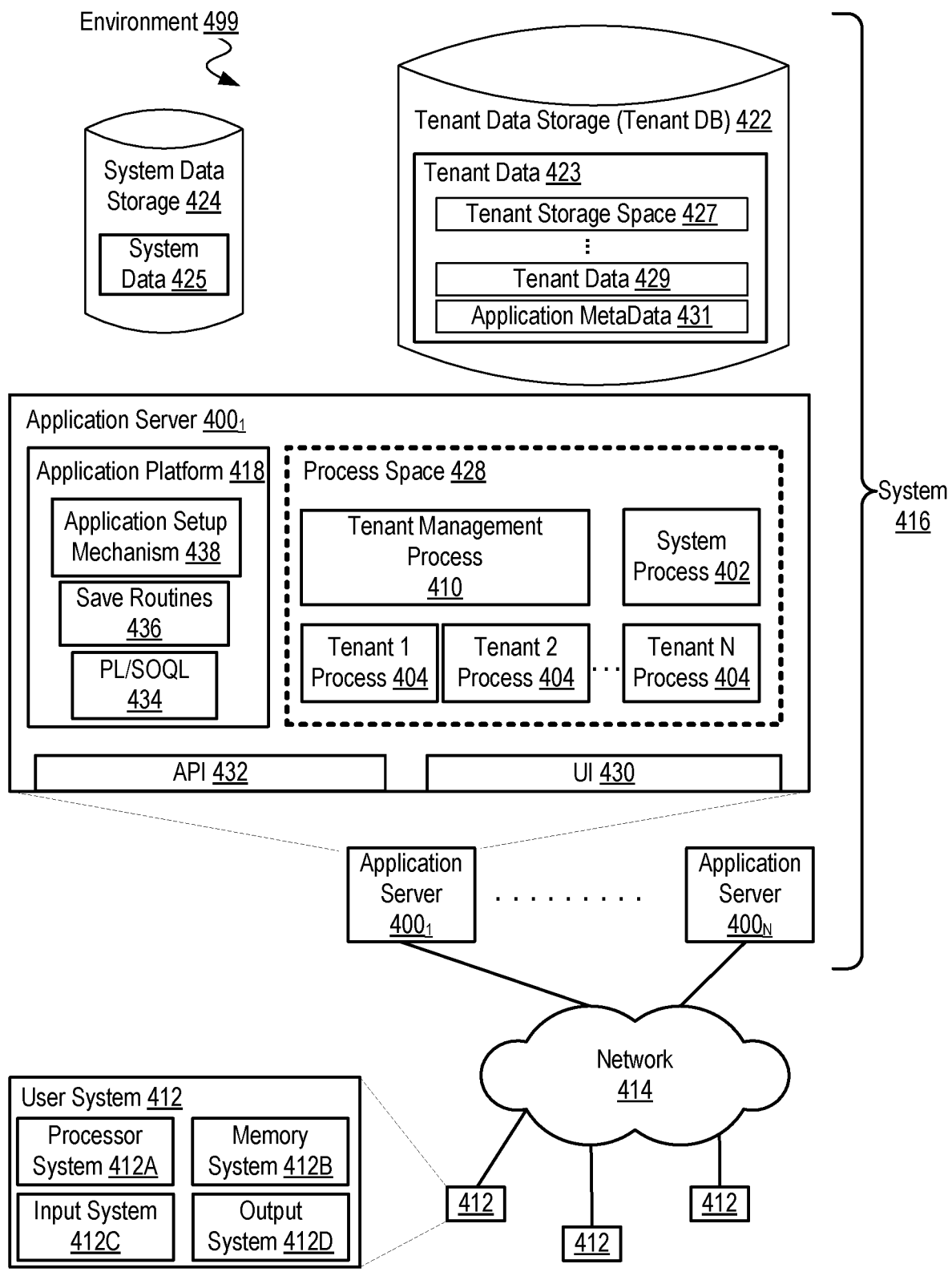

FIG. 4B illustrates another block diagram of an embodiment of elements of FIG. 4A and various possible interconnections between such elements in accordance with the described embodiments. FIG. 4B also illustrates environment 499. However, in FIG. 4B, the elements of system 416 and various interconnections in an embodiment are illustrated in further detail. More particularly, FIG. 4B shows that user system 412 may include a processor system 412A, memory system 412B, input system 412C, and output system 412D. FIG. 4B shows network 414 and system 416. FIG. 4B also shows that system 416 may include tenant data storage 422, having therein tenant data 423, which includes, for example, tenant storage space 427, tenant data 429, and application metadata 431. System data storage 424 is depicted as having therein system data 425. Further depicted within the expanded detail of application servers $400_{1-N}$ are User Interface (UI) 430, Application Program Interface (API) 432, application platform 418 includes PL/SOQL 434, save routines 436, application setup mechanism 438, process space 428 includes system process space 402, tenant 1-N process spaces 404, and tenant management process space 410. In other embodiments, environment 499 may not have the same elements as those listed above and/or may have other elements instead of, or in addition to, those listed above.

User system 412, network 414, system 416, tenant data storage 422, and system data storage 424 were discussed above in FIG. 4A. As shown by FIG. 4B, system 416 may include a network interface 420 (of FIG. 4A) implemented as a set of HTTP application servers 400, an application platform 418, tenant data storage 422, and system data storage 424. Also shown is system process space 402, including individual tenant process spaces 404 and a tenant management process space 410. Each application server 400 may be configured to tenant data storage 422 and the tenant data 423 therein, and system data storage 424 and the system data 425 therein to serve requests of user systems 412. The tenant data 423 might be divided into individual tenant storage areas (e.g., tenant storage space 427), which can be either a physical arrangement and/or a logical arrangement of data. Within each tenant storage space 427, tenant data 429, and application metadata 431 might be similarly allocated for each user. For example, a copy of a user's most recently used (MRU) items might be stored to tenant data 429. Similarly, a copy of MRU items for an entire organization that is a tenant might be stored to tenant storage space 427. A UI 430 provides a user interface and an API 432 provides an application programmer interface into system 416 resident processes to users and/or developers at user systems 412. The tenant data and the system data may be stored in various databases, such as one or more Oracle™ databases.

Application platform 418 includes an application setup mechanism 438 that supports application developers' creation and management of applications, which may be saved as metadata into tenant data storage 422 by save routines 436 for execution by subscribers as one or more tenant process spaces 404 managed by tenant management process space 410 for example. Invocations to such applications may be coded using PL/SOQL 434 that provides a programming language style interface extension to API 432. Invocations to applications may be detected by one or more system processes, which manage retrieving application metadata 431 for the subscriber making the invocation and executing the metadata as an application in a virtual machine.

Each application server 400 may be communicably coupled to database systems, e.g., having access to system data 425 and tenant data 423, via a different network connection. For example, one application server 400i might be coupled via the network 414 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 412 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user may hit three different application servers 400, and three requests from different users may hit the same application server 400. In this manner, system 416 is multi-tenant, in which system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 400 to request and update system-level and tenant-level data from system 416 that may require sending one or more queries to tenant data storage 422 and/or system data storage 424. System 416 (e.g., an application server 400 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

The term "user" may refer to a system user, such as, but not limited to, a software/application developer, a system administrator, a database administrator, an information technology professional, a program manager, product manager, etc. The term "user" may also refer to an end-user, such as, but not limited to, an organization (e.g., a business, a company, a corporation, a non-profit entity, an institution, an agency, etc.) serving as a customer or client of the provider (e.g., Salesforce.com®) of a user device (such as user device 180 in FIG. 1) or an organization's representative, such as a salesperson, a sales manager, a product manager, an accountant, a director, an owner, a president, a system administrator, a computer programmer, an information technology ("IT") representative, etc.

It is to be noted that any references to software codes, data and/or metadata (e.g., Customer Relationship Model ("CRM") data and/or metadata, etc.), tables (e.g., custom object table, unified index tables, description tables, etc.), computing devices (e.g., server computers, desktop computers, mobile computers, such as tablet computers, smartphones, etc.), software development languages, applications, and/or development tools or kits (e.g., Force.com®, Force.com, Salesforce1®, Apex™ code, JavaScript™, jQuery™, Developerforce™, Visualforce™, Service Cloud Console Integration Toolkit™ ("Integration Toolkit" or "Toolkit"), Platform on a Service™ ("PaaS"), Chatter® Groups, Sprint Planner®, MS Project®, etc.), domains (e.g., Google®, Facebook®, LinkedIn®, Skype®, etc.), etc., discussed in this document are merely used as examples for brevity, clarity, and ease of understanding and that embodiments are not limited to any particular number or type of data, metadata, tables, computing devices, techniques, programming languages, software applications, software development tools/kits, etc.

Figure 5:
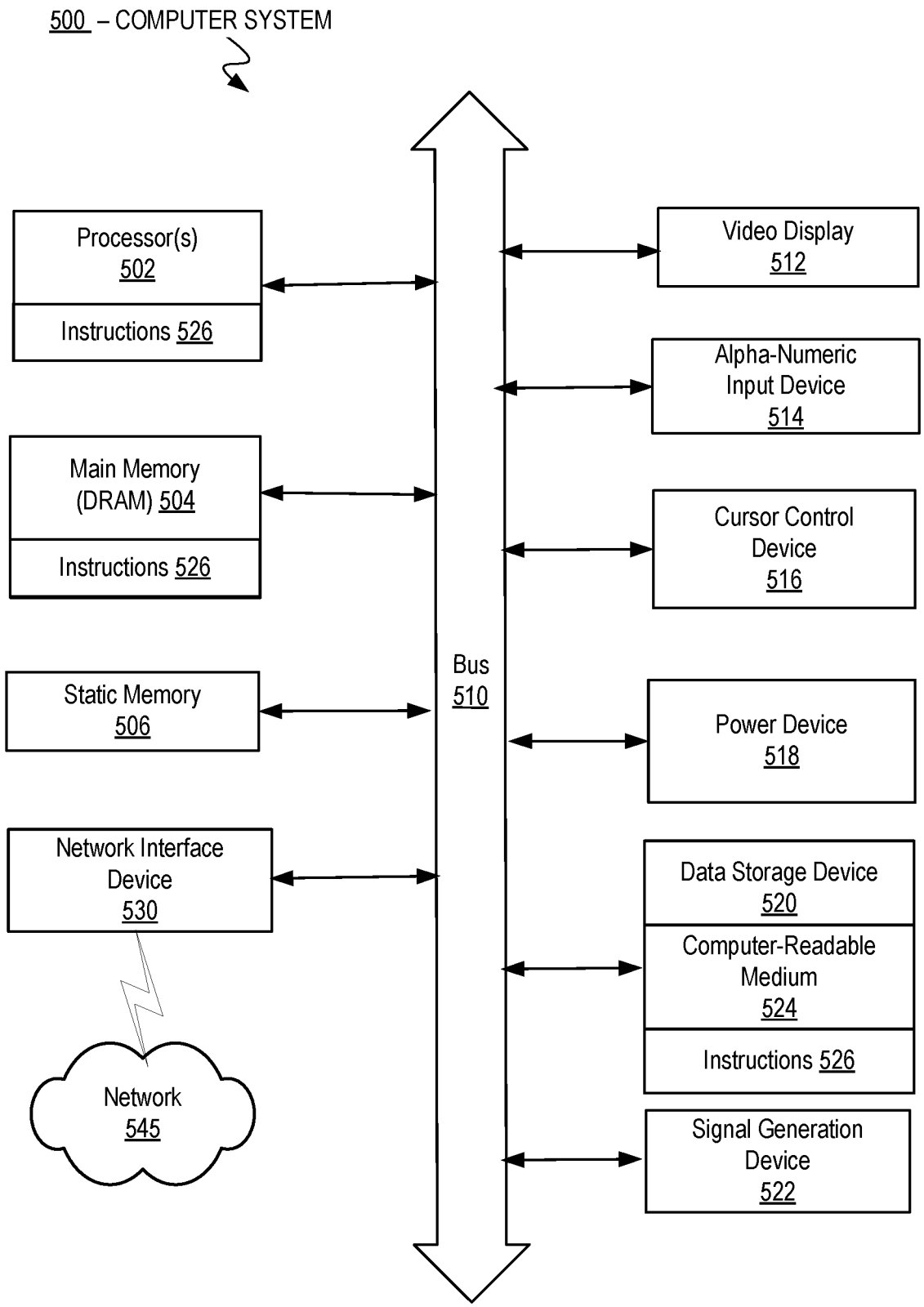
FIG. 5 illustrates a diagrammatic representation of a machine in the exemplary form of a general computer system within which one or more implementations of a system for structured development for web application frameworks may be carried out.

FIG. 5 illustrates a diagrammatic representation of a machine in the exemplary form of a computer system 500 within which a set of instructions (e.g., for causing the machine to perform any one or more of the methodologies discussed herein) may be executed. In alternative implementations, the machine may be connected (e.g., networked) to other machines in a LAN, a WAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a PDA, a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Some or all of the components of the computer system 500 may be utilized by or illustrative of any of the electronic components described herein (e.g., any of the components illustrated in or described with respect to FIGS. 1, 2, 3 and 4A-4B).

The exemplary computer system 500 includes a processing device (processor) 502, a main memory 504 (e.g., ROM, flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 520, which communicate with each other via a bus 510.

Processor 502 represents one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the operations and steps discussed herein. Processor 502 may have one or more processing cores.

Computer system 500 may further include a network interface device 530. Computer system 500 also may include a video display unit 512 (e.g., a liquid crystal display (LCD), a cathode ray tube (CRT), or a touch screen), an alphanumeric input device 514 (e.g., a keyboard), a cursor control device 516 (e.g., a mouse or touch screen), and a signal generation device 522 (e.g., a loud speaker).

Power device 518 may monitor a power level of a battery used to power computer system 500 or one or more of its components. Power device 518 may provide one or more interfaces to provide an indication of a power level, a time window remaining prior to shutdown of computer system 500 or one or more of its components, a power consumption rate, an indicator of whether computer system is utilizing an external power source or battery power, and other power related information. In some implementations, indications related to power device 518 may be accessible remotely (e.g., accessible to a remote back-up management module via a network connection). In some implementations, a battery utilized by power device 518 may be an uninterruptable power supply (UPS) local to or remote from computer system 500. In such implementations, power device 518 may provide information about a power level of the UPS.

Data storage device 520 may include a computer-readable storage medium 524 (e.g., a non-transitory computer-readable storage medium) on which is stored one or more sets of instructions 526 (e.g., software) embodying any one or more of the methodologies or functions described herein. Instructions 526 may also reside, completely or at least partially, within main memory 504 and/or within processor 502 during execution thereof by computer system 500, main memory 504, and processor 502 also constituting computer-readable storage media. Instructions 526 may further be transmitted or received over a network 545 (e.g., network 14) via network interface device 530.

In one implementation, instructions 526 include instructions for performing any of the implementations described herein. While computer-readable storage medium 524 is shown in an exemplary implementation to be a single medium, it is to be understood that computer-readable storage medium 524 may include a single medium or multiple media (e.g., a centralized or distributed database, and/or associated caches and servers) that store the one or more sets of instructions.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method comprising:
    receiving a specification for defining a web application providing a functionality, the specification defining a scripting language used for specifying the web application;
    parsing the specification to identify a plurality of software components arranged in a tree structure and interactions between the plurality of software components;
    analyzing the tree structure and the interactions to identify one or more software components that are at least one of redundant and functionally equivalent to another software component;
    restructuring the tree structure of the web application to replace the one or more redundant or functionally equivalent software components with the another software component, while retaining the functionality and external operation of the web application; and
    generating a new specification defining the web application using the restructured tree structure;
    wherein the functionality comprises a user interface functionality, and the another software component comprises a reusable user interface software component obtained from a selected external library in a web application framework.

2. The method of claim 1, comprising performing the receiving, parsing, analyzing, restructuring and generating by a structured software development program running within an integrated development environment on a computing system.

3. The method of claim 2, comprising deploying the web application in an on-demand services environment in an enterprise cloud computing platform using a continuous integration/continuous development (CI/CD) programming model.

4. The method of claim 1, comprising:
    automatically performing the receiving, parsing, analyzing, and restructuring;
    displaying the restructured tree structure and the identified redundant or functionally equivalent software components to a developer of the web application; and
    performing the generating after receiving acceptance of the restructured tree structure from the developer.

5. The method of claim 4, comprises repeating the receiving, parsing, analyzing, displaying, restructuring, and generating to reduce refactoring of the web application after development of the web application is complete.

6. The method of claim 1, wherein the selected external library comprises a testing library.

7. The method of claim 1, wherein the selected external library comprises linting files for analyzing errors in the plurality of software components.

8. A system comprising:
    a specification defining a web application providing a functionality, the specification defining a scripting language used for specifying the web application;
    a processing device; and
    a memory device coupled to the processing device, the memory device having instructions stored thereon that, in response to execution by the processing device, cause the processing device to:
    parse the specification to identify a plurality of software components arranged in a tree structure and interactions between the plurality of software components;
    analyze the tree structure and the interactions to identify one or more software components that are at least one of redundant and functionally equivalent to another software component;
    restructure the tree structure of the web application to replace the one or more redundant or functionally equivalent software components with the another software component, while retaining the functionality and external operation of the web application; and
    generate a new specification defining the web application using the restructured tree structure;
    wherein the functionality comprises a user interface functionality, and the another software component comprises a reusable user interface software component obtained from a selected external library in a web application framework.

9. The system of claim 8, wherein the component analyzer is part of a structured software development program running within an integrated development environment on a computing system.

10. The system of claim 9, comprising an on-demand services environment in an enterprise cloud computing platform using a continuous integration/continuous development (CI/CD) programming model to deploy the web application.

11. The system of claim 8, comprising a component visualizer to display the tree structure and the identified redundant or functionally equivalent software components to a developer of the web application; wherein the component analyzer to perform the generating after receiving acceptance of the restructured tree structure from the developer.

12. The system of claim 11, wherein the component analyzer to repeat the receiving, parsing, analyzing, displaying, restructuring, and generating to reduce refactoring of the web application after development of the web application is complete.

13. The system of claim 8, wherein the selected external library comprises a testing library.

14. The system of claim 8, wherein the selected external library comprises linting files for analyzing errors in the plurality of software components.

15. A tangible, non-transitory computer-readable storage medium having instructions stored thereon which, when executed by a processing device, cause the processing device to:

receive a specification for defining a web application providing a functionality, the specification defining a scripting language used for specifying the web application;

parse the specification to identify a plurality of software components arranged in a tree structure and interactions between the plurality of software components;

analyze the tree structure and the interactions to identify one or more software components that are at least one of redundant and functionally equivalent to another software component;

restructure the tree structure of the web application to replace the one or more redundant or functionally equivalent software components with the another software component, while retaining the functionality and external operation of the web application; and generate a new specification defining the web application using the restructured tree structure;

wherein the functionality comprises a user interface functionality, and the another software component comprises a reusable user interface software component obtained from a selected external library in a web application framework.

16. The tangible, non-transitory computer-readable storage medium of claim 15, having instructions stored thereon which, when executed by a processing device, cause the processing device to:

display the tree structure and the identified redundant or functionally equivalent software components to a developer of the web application; wherein the generating the new specification is performed after receiving acceptance of the restructured tree structure from the developer.

17. The tangible, non-transitory computer-readable storage medium of claim 16, wherein the instructions to repeat the receiving, parsing, analyzing, displaying, restructuring, and generating the new specification reduce refactoring of the web application after development of the web application is complete.

* * * * *